US009146970B2

(12) United States Patent
Bertram et al.

(10) Patent No.: US 9,146,970 B2
(45) Date of Patent: Sep. 29, 2015

(54) INLINE GRAPHIC SCOPER INTEGRATED WITH A SEARCH NAVIGATOR

(71) Applicant: International Business Machines Corporation, Armonk, NY (US)

(72) Inventors: Randal L. Bertram, Raleigh, NC (US); Mark E. Molander, Cary, NC (US); Alejandro M. Ortiz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/778,493

(22) Filed: Feb. 27, 2013

(65) Prior Publication Data

US 2014/0244620 A1 Aug. 28, 2014

(51) Int. Cl.
| | |
|---|---|
| *G06F 3/048* | (2013.01) |
| *G06F 17/30* | (2006.01) |
| *G06F 9/44* | (2006.01) |
| *G06F 3/0482* | (2013.01) |
| *G06F 3/0481* | (2013.01) |

(52) U.S. Cl.
CPC ........ *G06F 17/30554* (2013.01); *G06F 3/0481* (2013.01); *G06F 3/0482* (2013.01); *G06F 9/4443* (2013.01); *G06F 17/30572* (2013.01); *G06F 17/30657* (2013.01); *G06F 17/30663* (2013.01); *G06F 17/30985* (2013.01)

(58) Field of Classification Search
CPC ... G06F 3/0481; G06F 3/0482; G06F 9/4443; G06F 17/30554; G06F 17/30663; G06F 17/30657
See application file for complete search history.

(56) References Cited

U.S. PATENT DOCUMENTS

| | | | |
|---|---|---|---|
| 6,085,187 A | 7/2000 | Carter et al. | |
| 6,484,190 B1 * | 11/2002 | Cordes et al. | 715/207 |
| 2003/0217354 A1 * | 11/2003 | Bates et al. | 717/129 |

(Continued)

FOREIGN PATENT DOCUMENTS

| | | |
|---|---|---|
| EP | 1605375 A1 | 12/2005 |
| WO | 2014132156 A1 | 9/2014 |

OTHER PUBLICATIONS

State IP Office of the P.R. China, "Notification of Transmittal of the International Search Report and the Written Opinion of the International Searching Authority, or the Declaration," Jun. 11, 2014, International Application No. PCT/IB2014/058902.

*Primary Examiner* — Ajay Bhatia
*Assistant Examiner* — Jian Yu
(74) *Attorney, Agent, or Firm* — Patricia B. Feighan; Jennifer M. Anda (57) ABSTRACT

A method for searching data on a computer system is provided. The method includes the displaying of a plurality of navigation nodes in a graphical navigation string on a display. The navigation nodes comprise a navigation hierarchy, having a first level and a second level. The method further includes the displaying of a finder field on the display adjacent to the plurality of navigation nodes in the graphical navigation string for searching the first level of the navigation hierarchy. It also includes the displaying of a navigation scope bar for searching the second level of the navigation hierarchy. Additionally, it includes a processor that determines a refined search criteria based on a movement of the navigation scope bar with respect to a navigation node within the plurality of navigation nodes in the graphical navigation string. The method further includes the sending of the refined search criteria to a search engine.

19 Claims, 6 Drawing Sheets

(56) References Cited

U.S. PATENT DOCUMENTS

| | | | |
|---|---|---|---|
| 2004/0249824 A1* | 12/2004 | Brockway et al. | 707/100 |
| 2005/0108620 A1* | 5/2005 | Allyn et al. | 715/500 |
| 2005/0278656 A1* | 12/2005 | Goldthwaite et al. | 715/810 |
| 2006/0004734 A1* | 1/2006 | Malkin et al. | 707/4 |
| 2007/0168886 A1* | 7/2007 | Hally et al. | 715/854 |
| 2007/0266341 A1 | 11/2007 | Bicker et al. | |
| 2008/0256489 A1* | 10/2008 | Maurer et al. | 715/833 |
| 2009/0063517 A1* | 3/2009 | Wright et al. | 707/100 |
| 2009/0319956 A1 | 12/2009 | Emard et al. | |
| 2011/0102336 A1* | 5/2011 | Seok et al. | 345/173 |

* cited by examiner

INLINE GRAPHIC SCOPER INTEGRATED WITH A SEARCH NAVIGATOR

FIELD OF THE INVENTION

The present invention relates generally to computer searching of data, and more particularly, to providing ways to dynamically adjust the scope of data searches.

BACKGROUND

As high speed computer networks extend beyond physical boundaries (e.g., work, home, etc.) to encompass the vast network space that is represented by the Internet, locating and bounding information, content and data becomes increasingly difficult. Even at the level of a single PC having significant storage capability, providing the user with easy to understand views and organizational tools for filtering and displaying large sets of data can be challenging.

For instance, with regard to filtering data, while a user is often permitted to conduct content searches based upon key words and the like, the amount of information, data and content that is returned based upon such searches is often times still voluminous enough to be overwhelming as the user has limited filtering options and/or options for setting content parameters. Additionally, the user often has no means by which to organize and filter the returned data in a manner that would allow presentation of only a manageable amount of information and/or that presents the data in a manner wherein the content most useful to the user is presented in a more prominent fashion (e.g., displayed first in a data listing).

With regard to displaying data, information and content, data sets are often too large for each data element within the set to be represented on the viewable display area. Thus, when viewing such large data sets, it may be difficult for the user to readily determine how much information, content, or data may be part of the data set, but which is not present in the viewable display area.

The ability to scope searches is becoming increasingly common. By scoping searches, a user may define the scope of a search to be narrower or broader. For example, at a retail store website, a scoper may provide the user with the ability to conduct searching within a particular category of product (i.e., sporting goods). Currently, scopers allow users to search within different sub-domains via a drop-down list; however, such scopers may be restricted with respect to the navigation hierarchy displayed by a user interface.

Accordingly, a user interface which presents data to a user in such a way that the relative amount of data in the data set is readily apparent would be desirable. Additionally, a method of providing access to a large range of data, content and information without overwhelming the user would be advantageous. Further, it would be advantageous if such method permitted presentation of the data in a manner wherein the data most useful to the user was prominently set forth.

SUMMARY

Embodiments of the present invention provide an improved graphical user interface (GUI) for refining a scope of a search. In one aspect, a method for refining a search may include the use of a GUI rendering navigation scope bar that allows a search to be broadened or narrowed by moving the bar from left to right or from right to left. The method further includes the displaying of a plurality of navigation nodes in a graphical navigation string. The navigation nodes comprise a navigation hierarchy, having a first level and a second level. The method further includes the displaying of a finder field adjacent to the plurality of navigation nodes in the graphical navigation string for searching the first level of the navigation hierarchy. It also includes the displaying of a navigation scope bar for searching the second level of the navigation hierarchy. Additionally, it includes a processor that determines a refined search criteria based on a movement of the navigation scope bar with respect to a navigation node within the plurality of navigation nodes in the graphical navigation string. The method further includes the sending of the refined search criteria to a search engine.

An alternative method to render the graphical navigation scope bar may include displaying detents which correspond to each of the graphical navigation nodes which provide points to click on to narrow or broaden a search.

Another implementation may include a translucent overlay for searching the navigation hierarchy by moving the translucent overlay from left to right or right to left. Yet another implementation may include rendering a navigation tree to display the navigation hierarchy. In addition to the graphical navigation scope bar, translucent overlay, detents, or navigation tree, a finder field would also be present to search within a level of the navigation hierarchy.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following described exemplary embodiments relate to a user interface (UI) for presenting and displaying data sets to a user that incorporates a filtering device referred to herein as "scoper". Scope control enables the user to dynamically adjust a current range of view for the information, content and data displayed on the UI. A scope control tool described herein may be accessible from all screens in the UI. The software tool described in various embodiments of the present invention may be applied to control screens, tools, or application screens.

By scoping searches, a user may refine their search more accurately and easily by either broadening or narrowing the search. Currently, scopers are not intuitive and user friendly enough to encourage a more targeted graphical way to re-scope a search. By combining scope control with the data display options permitted by, for example, a 3-D UI design, access may be provided to a large range of information without overwhelming the user. Accordingly, in one aspect, various embodiments of the present invention are directed to a UI for representing content, information and data to a user. Advantageously, the search mechanism described herein permits a more intuitive and more productive search process.

Scope control enables the user to dynamically adjust a current range of view for the information, content, and data displayed on the UI. For example, this could save valuable time by leading to fewer irrelevant search results. Additionally, the scope control tool described herein 1 can make the search function less confusing by providing an easier user interface (search interface). Various embodiments of the present invention further permit the inclusion and delineation of one or more narrow subsets of data within the display encompassed by a relatively broad scope setting, if desired.

Figure 1:
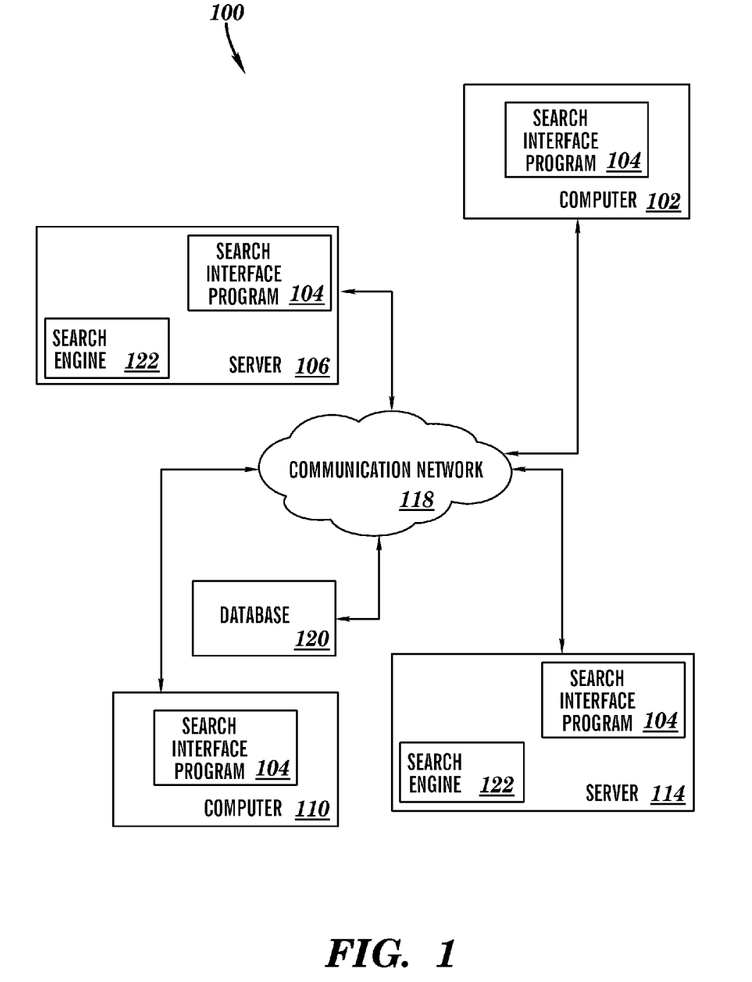
FIG. 1 illustrates a networked computer environment in which embodiments of the present invention may be practiced.

Referring to FIG. 1, an exemplary networked computer environment 100 is depicted in which various embodiments of the present invention may be practiced. The network computer environment 100 may include a plurality of client computers 102 and 110 (only two of which are shown), servers 106 and 114 and a database 120. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with server 106 and database 120 via the network 118, e.g., the Internet. The computer 110 may communicate with server 114 and database 120 also via the communication network 118. Network 118 may include connections, such as wire, wireless communication links, or fiber optic cables. As will be discussed with reference to FIG. 6, server computers 106 and 114 may include internal components 800a, 800b and external components 900a, 900b, respectively, and client computers 102 and 110 may include internal components 800c, 800d and external components 900c, 900d, respectively. Client computer 102 and 110 may be, for example, a mobile device, a telephone, a personal digital assistant, a netbook, a laptop computer, a tablet computer, a desktop computer, or any type of computing devices capable of hosting a GUI.

The client computers 102 and 110 may be programmed to execute a graphical user interface containing search interface 104 (e.g. such as a web browser plug-in) and access content managed by the servers 106 and 114.

In the embodiments of the present invention described below, users are respectively operating client computers 102 and 110 that are connected to the search engine 122 running on the servers 106 and/or 114 via search interface 104. Data or content may be presented to a user using a navigation hierarchy having more than one level. In various embodiments of the present invention, the first level of the navigation hierarchy, i.e., the navigation nodes 338-352 for a navigation tree, 332 (FIG. 3) may be displayed. The navigation tree 332 may include a plurality of navigation nodes 338-352. Additionally, a second level of the navigation hierarchy or navigation string 310, may be displayed for navigation tree 332. The content of the second level of the navigation hierarchy, i.e. navigation string 310, may also include a plurality of navigation nodes 318-330 (FIG. 3), i.e, the nodes that are currently selected. The navigation string 310 is a linear bar which displays the currently selected navigation branch in the currently selected navigation tree 332. The hierarchy of the content navigation that is displayed to a user may be transmitted from servers 106 and 114 to that user's client computer 102 or 110 and processed by search interface 104 stored in that user's client computer 102 or 110 for display through the computer display monitor 920.

As described in the following paragraphs, in an embodiment of the present invention a graphical user interface (GUI) may be run which displays a search interface to facilitate dynamic adjustment of the search scope to be applied to a particular data set (see FIG. 2). The graphical user interface may depict a navigation scope bar 314 (FIG. 3). The navigation scope bar 314 is a graphically represented line that is located under at least one of the plurality of navigation nodes 318-330 in the navigation string 310. Another embodiment contemplates the search interface program 104 to display a translucent overlay 410 (FIG. 4). The translucent overlay 410 is a graphically represented highlighted bar that is located over at least one of the plurality of navigation nodes 318-330 in the navigation string 310.

Another embodiment illustrates how the search interface program 104 may display detents 402-406 (FIG. 4) for at least one of the navigation nodes 318-330 in the navigation string 310. Detents 402-406 may act as guided click points for at least one of the navigation nodes 318-330 in the navigation string 310. Detents 402-406 may be displayed at each one of the plurality of navigation nodes 318-330 in the graphical navigation string 310. For example, the default search may start with the scoping mechanism scoped to the second level of current navigation context. In FIG. 4, this would be "Properties" navigation node 330. The user may click on one of the detents 402-406 corresponding to one of the displayed navigation nodes 318-330 to broaden the scope of the search.

Another exemplary embodiment describes how the search interface program 104 may use a navigation tree 502 (FIG. 5) and a drop-down menu 504 to allow a user to refine a search criteria. The navigation tree 502 is a graphically represented hierarchy that displays at least one of the plurality of navigation nodes 318-330 and may display a list of sub nodes 424 in the navigation string 310 which correlates to the corresponding drop-down menu 504.

Figure 2:
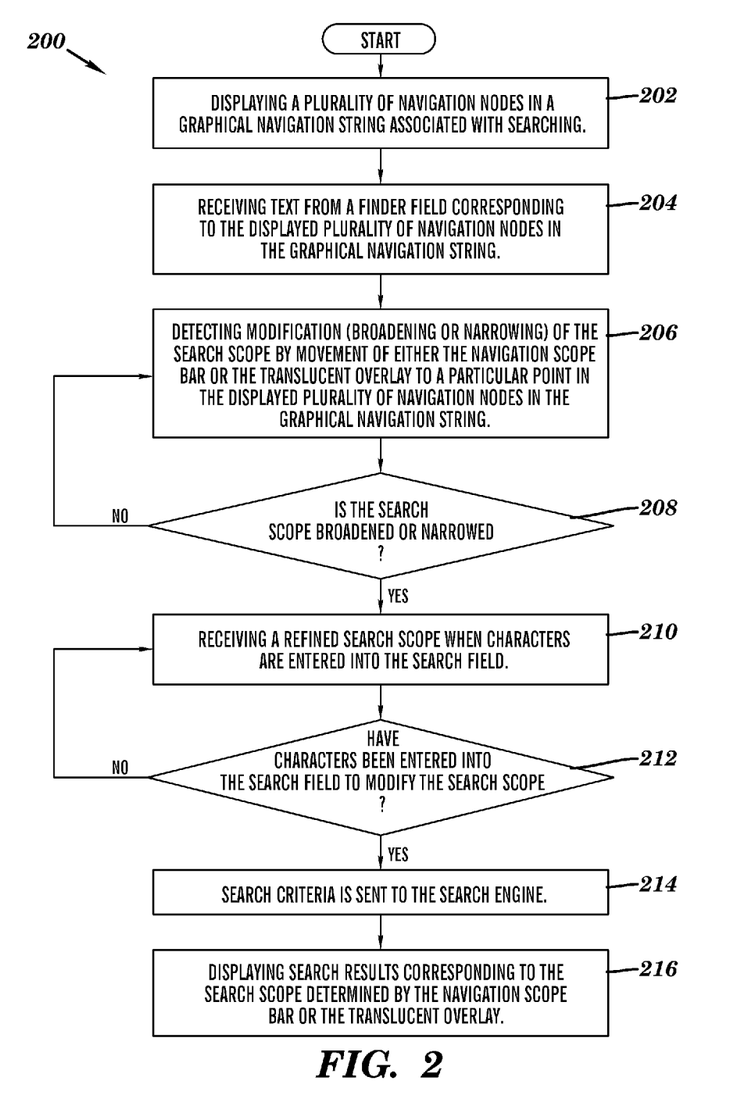
FIG. 2 is a flow chart illustrating the steps carried out by a search interface program to facilitate a search using a graphical scoper in accordance with an embodiment of the present invention.
Figure 3:
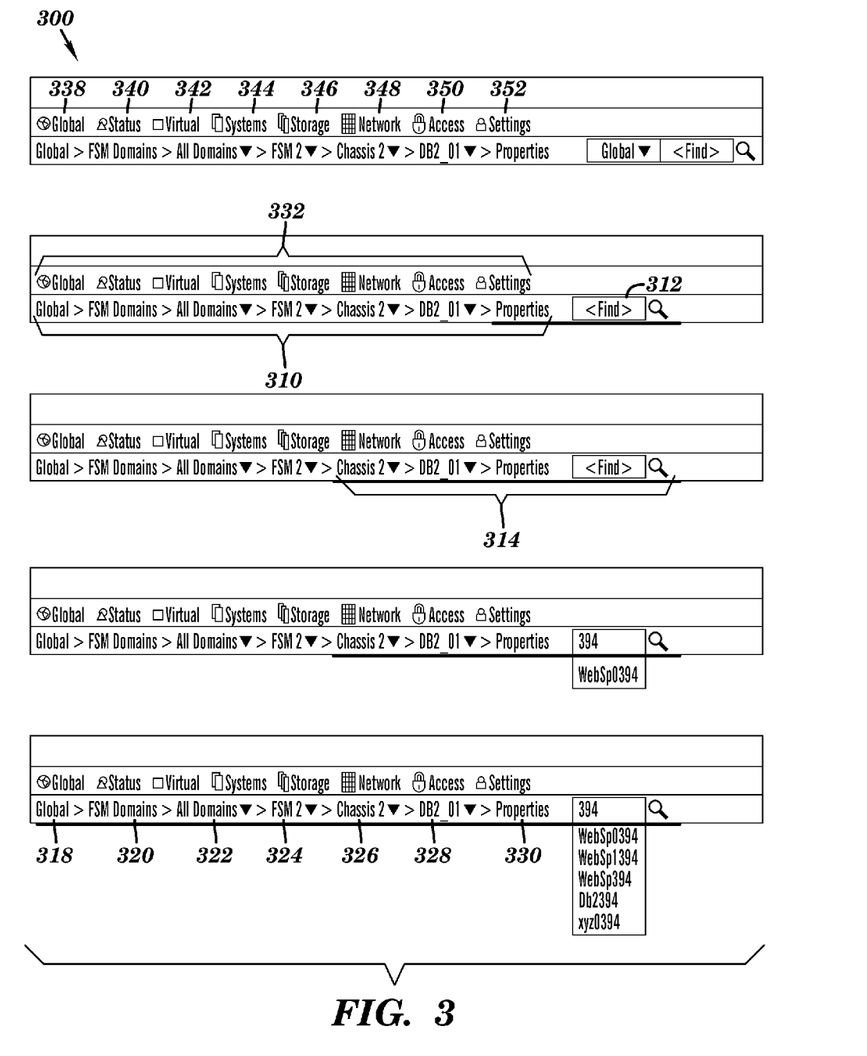
FIG. 3 is a perspective view of a search interface employing a graphical navigation scope bar in accordance with an embodiment of the present invention.
Figure 4:
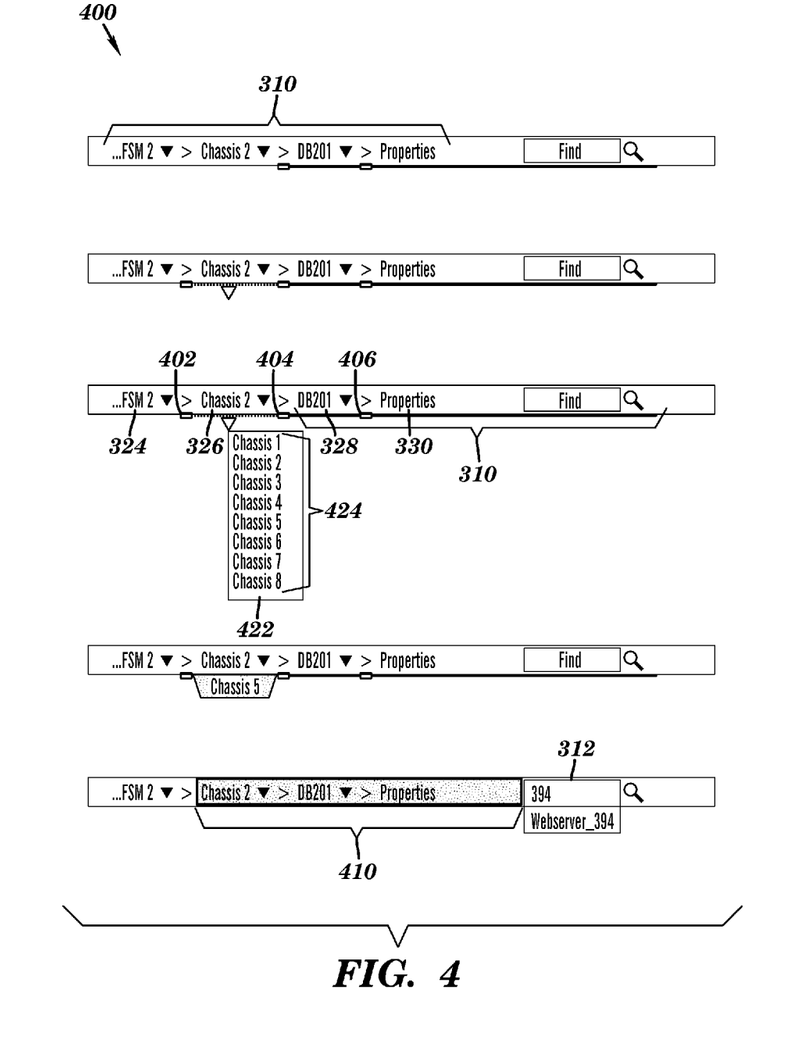
FIG. 4 is a perspective view of a search interface employing a translucent overlay and detents in accordance with another embodiment of the present invention.

FIG. 2 is a flow chart 200 illustrating the steps carried out by search interface 104 to facilitate a search using a graphical scoper in accordance with embodiments of the present invention as depicted in FIGS. 3 and 4. Referring to FIG. 2, once the initial data set is accessed and displayed, at 202, search interface 104 may display a plurality of navigation nodes 318-330 (FIG. 3) in a graphical navigation string 310 associated with content searching. Navigation nodes 318-330 provide potential scope options. For example, if server 106 stores a system management website, a user operating client computer 102 may be able to conduct searching within a particular category, such as, "Global" represented by navigation node "Global" 318. Similarly, search interface 104 may display other navigation nodes 320-330 included in the graphical navigation string 310, such as "Properties" 330, DB2_01" 328, "Chassis 2" 326, or "FSM 3" 324. In an embodiment of the present invention, search interface 104 may receive navigation nodes 318-330 from server computer 106.

At 204, search interface 104 may receive text which a user may have entered into a finder field 312 (FIG. 3) which corresponds to the plurality of navigation nodes 318-330 in the graphical navigation string 310. For example, the user may type text into the finder field 312 rendered on the same page as the plurality of navigation nodes 318-330 in the graphical navigation string 310 associated with the search being displayed. Therefore, the user may type in a search term in the finder field 312 to refine the search. For example, as illustrated in FIG. 3, the user may type in "394" in the finder field 312 to refine the search criteria.

At 206, the search interface 104 detects whether the user has modified, i.e., broadened or narrowed the search scope. In various embodiments, users may be able to modify the scope by moving either a navigation scope bar 314 or a translucent overlay 410 (FIG. 4) to a particular point in the displayed plurality of navigation nodes 318-330 in the graphical navigation string 310. The navigation scope bar 314 is a graphically represented line that is located under at least one of the plurality of navigation nodes 318-330 in the graphical navigation string 310. The user may adjust the navigation scope bar 314, for example, by dragging the navigation scope bar 314 to a predefined region corresponding to each of the plurality of navigation nodes 318-330 in the graphical navigation string 310. For example, the user could drag the navigation scope bar 314 from right to left to broaden the scope of the search. With respect to FIG. 3, the user could drag the navigation scope bar 314 across the navigation nodes 318-330 that are displayed to broaden or narrow the scope of the search.

In an alternative embodiment, users may be able to modify the scope by moving the translucent overlay 410 (FIG. 4) to a particular point in the displayed plurality of navigation nodes 318-330 in the graphical navigation string 310. The translucent overlay 410 may be implemented as a graphically represented highlighted overlay that highlights at least one of the plurality of navigation nodes 318-330 in the graphical navigational string 310. The user may adjust the translucent overlay 410 by moving it to a predefined region corresponding to each of the plurality of navigation nodes 318-330 in the graphical navigation string 310. For example, the user could move the translucent overlay 410 from right to left to broaden the scope of the search.

Referring back to FIG. 2, at 208, if search interface 104 determines that the search string has been either broadened or narrowed, the search may be refined further at 210 in response to receiving user's input of the first few characters of the search text into the search field 312. For example, if the user in FIG. 3 or FIG. 4 modified the search criteria by either adjusting the navigation scope bar 314 or the translucent overlay 410, they may further refine the search by typing the first few characters of the search term, i.e., "394" in the finder field 312.

At 212, if search interface 104 determines that text has been entered into the finder field 312 then at 214, the search interface 104 may transmit the search criteria to the search engine 122. Then, at 216, the search interface displays the results corresponding to the scope as determined by the navigation scope bar 314 or the translucent overlay 410 FIG. 4. For example, the user in FIG. 3 or FIG. 4 may enter "394" in the finder field 312 after adjusting the search scope either by modifying the navigation scope bar 314 or the translucent overlay 410 to display more refined search results.

FIG. 3 illustrates one embodiment of facilitating navigation within the navigation tree 332 via a navigation scope bar 314. The navigation scope bar 314 is a graphically represented line that is located under at least one of the plurality of navigation nodes 318-330 in the graphical navigation string 310. The navigation scope bar 314 has an adjustable width that corresponds to the scope of search. Additionally the finder field 312 is proportional to the adjustable width of the navigation scope bar 314.

A user may adjust the navigation scope bar 314 by dragging it to a predefined region corresponding to each of the plurality of navigation nodes 318-330 in the navigation string 310. For example, the default search may start with the finder scoped to the first level of current navigation context. In FIG. 3, this would be "Properties" navigation node 330. The user may drag the navigation scope bar 314 from right to left across the displayed navigation nodes 318-330 to broaden the scope of the search. With respect to FIG. 3, the user may drag the navigation scope bar 314 across the displayed navigation nodes 318-330 to broaden the scope of the search. Therefore, in this example, the user may drag the navigation scope bar 314 from "Properties" navigation node 330 on the right, over to "Chassis 2" navigation node 326, on the left, to broaden the search. Then the user may type in a few characters, such as, "394" in the finder field 312, in this example, to refine the search. Similarly, the user may drag the navigation scope bar 314 from left to right across the displayed navigation nodes 318-330 to narrow the scope of the search. Therefore, in this example, the user may drag the navigation scope bar 314 from "Chassis 2" navigation node 326, on the left, to "DB201" navigation node 328, on the right, to narrow the search.

FIG. 4 illustrates another implementation of navigating within the navigation tree, 332 as depicted in FIG. 3 by using detents 402-406. The detents 402-406 are guided click points, and may be clicked on rather than dragging the navigation scope bar 314. Detents 402-406 may be displayed at each one of the plurality of navigation nodes 318-330 in the graphical navigation string 310. For example, the default search may start with the finder scoped to the second level of current navigation context. In FIG. 4, this would be "Properties" navigation node 330. The user may click on one of the detents 402-406 corresponding to one of the displayed navigation nodes 318-330 to broaden the scope of the search. Therefore, in this example, the user may click on the detent corresponding to navigation node "Chassis 2" 326, on the left, to broaden the search. Then the user may type in a few characters, such as, "394" in the finder field 312, in this example, to refine the search further. Similarly, the user may click on the detent corresponding to navigation node "DB201" 328, on the right, to narrow the search.

FIG. 4 further illustrates another embodiment of navigating within the navigation tree 332 (FIG. 3) via a translucent overlay 410. The translucent overlay 410 is a graphically represented highlighted bar that is located over at least one of the plurality of navigation nodes 318-330 in the graphical navigation string 310. The translucent overlay 410 may be adjusted by moving the translucent overlay 410 to a predefined region corresponding to each of the plurality of navigation nodes 318-330 in the navigation string 310. For example, the default search may start with the translucent overlay scoped to the second level of current navigation context. In FIG. 4, this would be "Properties" 330. The user may move the translucent overlay 410 from right to left to broaden the scope of the search. With respect to FIG. 4, the user may move the translucent overlay 410 across the displayed navigation nodes 318-330, from right to left, to broaden the scope of the search. Therefore, in this example, the user may move the translucent overlay 410 from "Properties" navigation node 330, on the right, over to "Chassis" navigation node 326, on the left, to broaden the search. Next, the user may click on "Chassis 2" navigation node 326 and a drop-down menu 422 may be shown displaying the list of navigation sub nodes 424. Then the user may type in a few characters, such as, "394" in the finder field 312, in this example, to refine the search. Similarly, the user may move the translucent overlay 410 across the displayed navigation nodes 318-330, from left to right, to narrow the scope of the search. Therefore, in this example, the user may move the translucent overlay 410 from "Chassis 2" navigation node 326, on the left, to "DB201" navigation node 238, on the right, to narrow the search.

Figure 5:
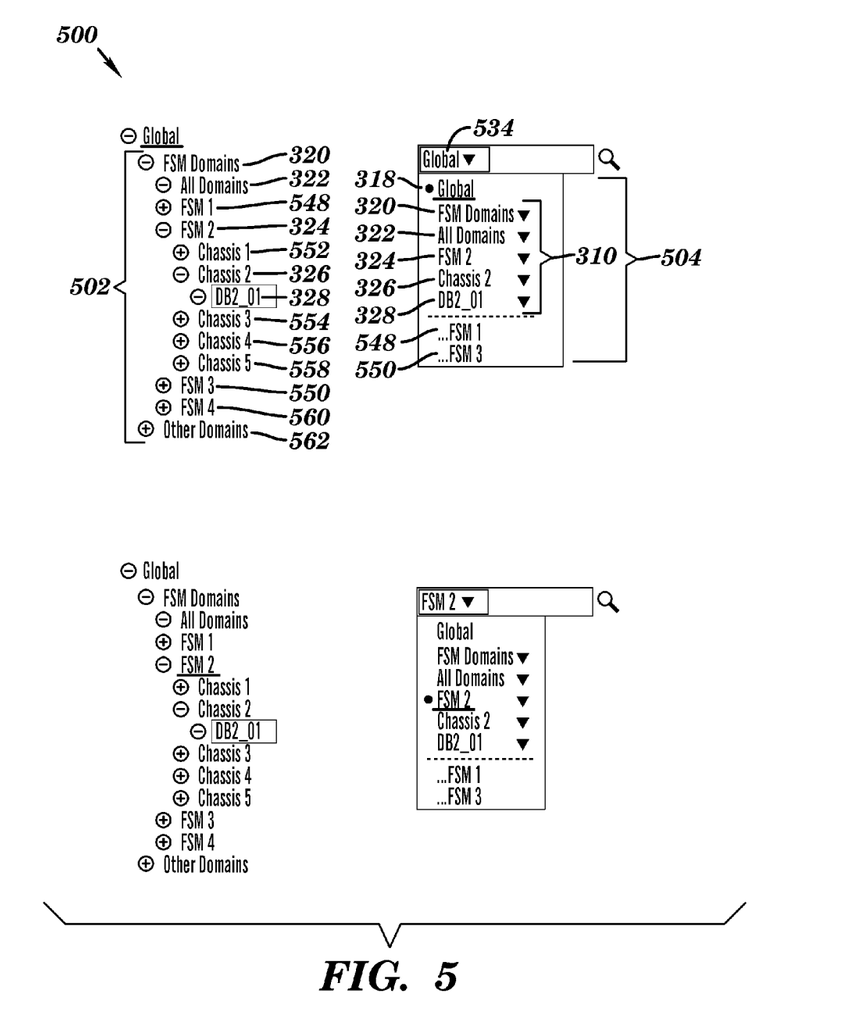
FIG. 5 is a perspective view of a search interface employing a navigation tree depicting the navigation hierarchy in accordance with yet another embodiment of the present invention.

FIG. 5 illustrates yet another embodiment of navigating within the navigation tree 502 as depicted. In this embodiment, search interface 104 may use a navigation tree 502 and a drop-down menu 504 to facilitate modification of user's search scope. According to an embodiment of the present invention, the navigation tree 502 may be a graphically represented hierarchy that displays at least one of the plurality of navigation nodes 318-330 in the graphical navigation string 310 being depicted, for example, in the drop-down menu 504. The navigation tree 502 may also display at least one of a plurality of sub nodes 548-562 in the list of sub nodes 424 being depicted. The drop-down menu 504 is a menu of options that appears when an item is selected. With respect to FIG. 5, the drop-down menu may display a list of navigation nodes 318-328 and a list of sub nodes 548-550 in the graphical navigation string 310. The navigational search may be refined by either clicking on one of the navigation nodes 318-328 or on one of the sub nodes 548-50 in the drop-down menu 504 or by expanding the corresponding navigation tree 502 by clicking on a navigation node 318-328 or a sub node 552-562 displayed in the navigation tree 502. The navigation tree includes a hierarchical display of the navigation nodes 318-328 and the sub nodes 552-562 which correlates to the corresponding drop-down menu 504. For example, the default search may start with the search scoped to the second level of current navigation context. In FIG. 5, this would be "Global" navigation node 318. The user may click on a navigation node 318-330 in the drop-down menu 504 to broaden the scope of the search. Alternatively, the user may click on a navigation node 318-328 or a sub node 552-562 on the corresponding navigation tree 502 to broaden the scope of the search. Therefore, in this example, the user may either click on "FSM Domains" navigation node 320 on the drop-down menu 504 or on "FSM Domains" navigation node 320 in the corresponding navigation tree 502 to broaden the search. Similarly, the user may click on a navigation node 318-328 or a sub node 552-562 on the corresponding navigation tree 502 to narrow the scope of the search. Therefore, in this example, the user may either click on "FSM 2" navigation node 324 on the drop-down menu 504 or on "FSM 2" navigation node 324 in the corresponding navigation tree 502 to narrow the search.

As can be understood, various embodiments of the present invention provide a user control for dynamically adjusting the scope of a set of content and/or data and a user interface for representing the same.

Figure 6:
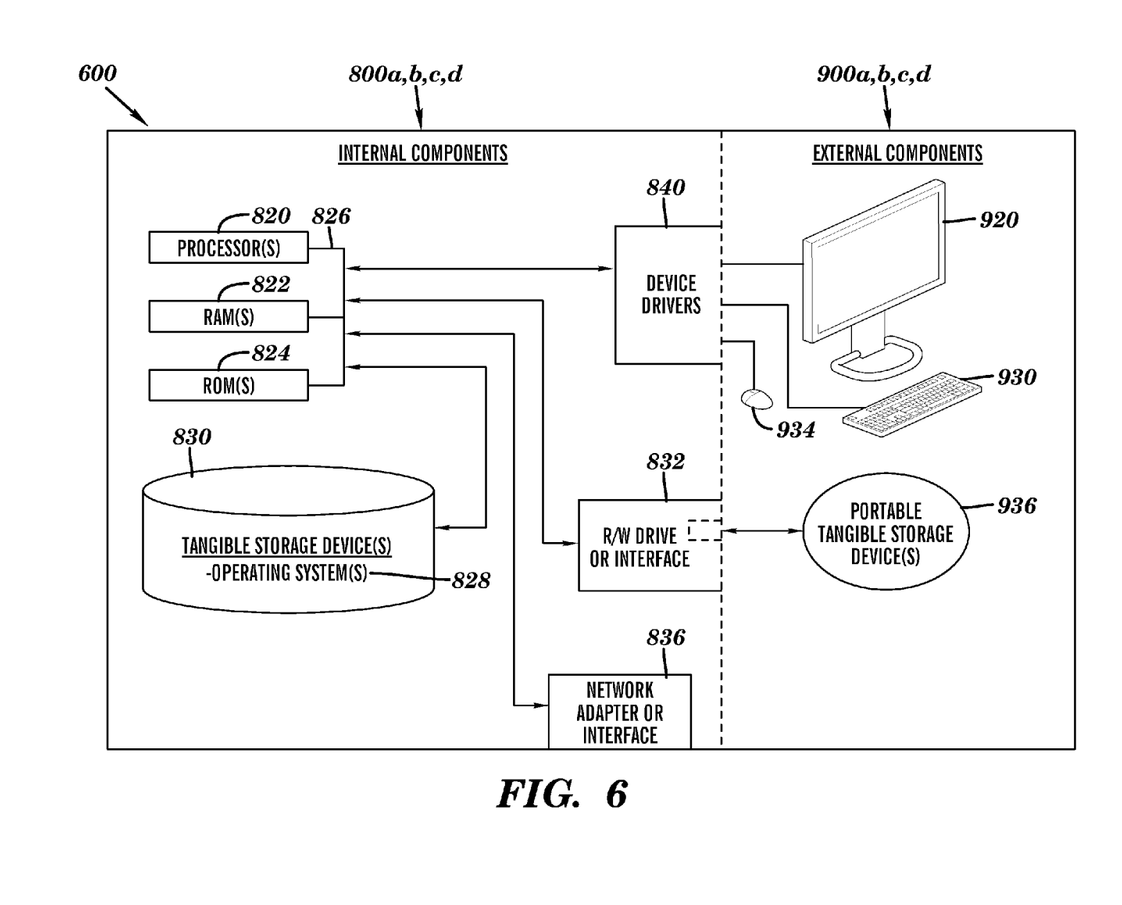
FIG. 6 is a block diagram of internal and external components of computers depicted in FIG. 1 in accordance with an illustrative embodiment of the present invention.

FIG. 6 is a block diagram of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computers 102 and 110, and network servers 106 and 114 include respective sets of internal components 800 a, b, c, d and external components 900 a, b, c, d illustrated in FIG. 6. Each of the sets of internal components 800 a, b, c, d includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and program 104 in client computer 102 or 110; are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c, d also includes a R/W drive or interface 832 to read from and write to one or more portable computer-readable tangible storage devices 936 such as a CD-ROM, DVD, memory stick, magnetic tape, magnetic disk, optical disk or semiconductor storage device. The search interface 104 in client computer 102, 110; can be stored on one or more of the respective portable computer-readable tangible storage devices 936, read via the respective R/W drive or interface 832 and loaded into the respective hard drive 830.

Each set of internal components 800 a, b, c, d also includes network adapters or interfaces 836 such as a TCP/IP adapter cards, wireless wi-fi interface cards, or 3G or 4G wireless interface cards or other wired or wireless communication links. The program 104 in client computer 102; programs 108 and 116, respectively in network servers 106 and 114; and program 112 in remote computer 110 can be downloaded to respective client computers 102 and 110 from an external computer via a network (for example, the Internet, a local area network or other, wide area network) and respective network adapters or interfaces 836. From the network adapters or interfaces 836, the program 104 in client computer 102; programs 108 and 116, respectively in network servers 106 and 114; and program 112 in remote computer 110 are loaded into the respective hard drive 830. The network may comprise copper wires, optical fibers, wireless transmission, routers, firewalls, switches, gateway computers and/or edge servers.

Each of the sets of external components 900 a, b, c, d can include a computer display monitor 920, a keyboard 930, and a computer mouse 934. External components 900 a, b, c, d can also include touch screens, virtual keyboards, touch pads, pointing devices, and other human interface devices. Each of the sets of internal components 800 a, b, c, d also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for searching data on a computer system, comprising:
    displaying a plurality of navigation nodes in a graphical navigation string on a display, the navigation nodes comprising a navigation hierarchy having a first level, and a second level, and wherein the navigation nodes are in a same horizontal row;
    displaying a finder field on the display adjacent to the plurality of navigation nodes in the graphical navigation string;
    displaying a navigation scope bar on the display, the navigation scope bar configured to search the second level of the navigation hierarchy, wherein the navigation scope bar is a graphically represented line that is located under the plurality of navigation nodes, and wherein a movement of the navigation scope bar comprises a user dragging the left end of the navigation scope bar from right to left in order to broaden the search or dragging the left end of the navigation scope bar from left to right in order to narrow the search;
    receiving a first plurality of text entered into the displayed finder field;
    determining a search criteria based on the received first plurality of text entered into the displayed finder field, using a program executable by a processor;
    determining a refined search criteria based on movement of the navigation scope bar with respect to a navigation node within the plurality of navigation nodes in the graphical navigation string after the search criteria is determined;
    determining a further refined search criteria based on a detection of a second plurality of characters being entered into the finder field after the refined search criteria is determined; and
    sending the further refined search criteria to a search engine.

2. The method of claim 1, further comprising:
    receiving text that has been entered into the finder field for searching within the second level of the navigation hierarchy.

3. The method of claim 1, wherein the first level of the navigation hierarchy is a lower level of the navigation hierarchy relative to the second level of the navigation hierarchy.

4. The method of claim 1, wherein the movement of the navigation scope bar comprises a user dragging the navigation scope bar to a predefined region corresponding to each of the plurality of navigation nodes in the graphical navigation string.

5. The method of claim 4, wherein the predefined region corresponding to each of the plurality of navigation nodes in the graphical navigation string comprises a plurality of detents.

6. The method of claim 1, wherein the navigation scope bar comprises an adjustable width, the scope of search corresponding to the finder field being proportional to the adjustable width of the navigation scope bar.

7. The method of claim 1, further comprising displaying a navigation tree corresponding to the plurality of navigation nodes in the graphical navigation string.

8. The method of claim 7, wherein the navigation tree is adjustable by expanding the plurality of navigation nodes in the graphical navigation string.

9. A method for searching data on a computer system, comprising:
    displaying a plurality of navigation nodes in a graphical navigation string on a display, the navigation nodes comprising a navigation hierarchy having a first level and a second level, and wherein the navigation nodes are in a same horizontal row;
    displaying a finder field on the display adjacent to the plurality of navigation nodes in the graphical navigation string;
    displaying a translucent overlay on the display, the translucent overlay configured to search the second level of the navigation hierarchy, wherein the translucent overlay is a graphically represented highlighted bar that is located over the plurality of navigation nodes, and wherein a movement of the translucent overlay comprises a user moving the left end of the translucent overlay from right to left in order to broaden the search or moving the left end of the translucent overlay from left to right in order to narrow the search;
    receiving a first plurality of text entered into the displayed finder field;
    determining a search criteria based on the received first plurality of text entered into the displayed finder field, using a program executable by a processor;
    determining a refined search criteria based on movement of the translucent overlay with respect to a navigation node within the plurality of navigation nodes in the graphical navigation string after the search criteria is determined;
    determining a further refined search criteria based on a detection of a second plurality of characters being entered into the finder field after the refined search criteria is determined; and
    sending the further refined search criteria to a search engine.

10. The method of claim 9, further comprising:
    receiving text that has been entered into the finder field for searching within the second level of the navigation hierarchy.

11. The method of claim 9, wherein the first level of the navigation hierarchy is a lower navigation hierarchy relative to the second level of the navigation hierarchy.

12. The method of claim 9, wherein the movement of the translucent overlay comprises dragging the translucent overlay to a predefined region corresponding to each of the plurality of navigation nodes in the graphical navigation string.

13. A computer system for providing data searches, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to display a plurality of navigation nodes in a graphical navigation string, the navigation nodes comprising a navigation hierarchy having a first level and a second level, and wherein the navigation nodes are in a same horizontal row;
    program instructions to display a finder field adjacent to the plurality of navigation nodes in the graphical navigation string;
    program instructions to display a navigation scope bar, the navigation scope bar configured to search the second level of the navigation hierarchy, wherein the navigation scope bar is a graphically represented line that is located under the plurality of navigation nodes, and wherein a movement of the navigation scope bar comprises a user dragging the left end of the navigation scope bar from right to left in order to broaden the search or dragging the left end of the navigation scope bar from left to right in order to narrow the search;

program instructions to display a navigation scope bar, the navigation scope bar configured to search the second level of the navigation hierarchy;

program instructions to receive a first plurality of text entered into the displayed finder field;

program instructions to determine a search criteria based on the received first plurality of text entered into the displayed finder field;

program instructions to determine a refined search criteria based on movement of the navigation scope bar with respect to a navigation node within the plurality of navigation nodes in the graphical navigation string after the search criteria is determined;

program instructions to determine a further refined search criteria based on a detection of a second plurality of characters being entered into the finder field after the refined search criteria is determined; and program instructions to send the further refined search criteria to a search engine.

14. The computer system of claim 13, further comprising:
program instructions to receive text that has been entered into the finder field for searching within the second level of the navigation hierarchy.

15. The computer system of claim 13, wherein the first level of the navigation hierarchy is a lower navigation hierarchy relative to the second level of the navigation hierarchy.

16. The computer system of claim 13, wherein the movement of the navigation scope bar comprises dragging the navigation scope bar to a predefined region corresponding to each of the plurality of navigation nodes in the graphical navigation string.

17. A computer program product for providing data searches, the computer program product comprising:
one or more computer-readable storage devices and program instructions stored on at least one of the one or more tangible storage devices, the program instructions comprising:
program instructions to display a plurality of navigation nodes in a graphical navigation string, the navigation nodes comprising a navigation hierarchy having a first level and a second level, and wherein the navigation nodes are in a same horizontal row;

program instructions to display a finder field adjacent to the plurality of navigation nodes in the graphical navigation string;

program instructions to display a navigation scope bar, the navigation scope bar configured to search the second level of the navigation hierarchy, wherein the navigation scope bar is a graphically represented line that is located under the plurality of navigation nodes, and wherein a movement of the navigation scope bar comprises a user dragging the left end of the navigation scope bar from right to left in order to broaden the search or dragging the left end of the navigation scope bar from left to right in order to narrow the search;

program instructions to receive a first plurality of text entered into the displayed finder field;

program instructions to determine a search criteria based on the received first plurality of text entered into the displayed finder field;

program instructions to determine a refined search criteria based on movement of the navigation scope bar with respect to a navigation node within the plurality of navigation nodes in the graphical navigation string after the search criteria is determined;

program instructions to determine a further refined search criteria based on a detection of a second plurality of characters being entered into the finder field after the refined search criteria is determined; and program instructions to send the further refined search criteria to a search engine.

18. The computer program product of claim 17, further comprising:
program instructions to receive text that has been entered into the finder field for searching within the second level of the navigation hierarchy.

19. The computer program product of claim 17, wherein the first level of the navigation hierarchy is a lower navigation hierarchy relative to the second level of the navigation hierarchy.

* * * * *